Patented Sept. 30, 1924.

1,510,358

UNITED STATES PATENT OFFICE.

VICTOR VANDEVOORDE, OF BRUSSELS, BELGIUM, ASSIGNOR TO N. V. NETHERLAND COLONIAL TRADING CY., OF BRUSSELS, BELGIUM, A CORPORATION.

METHOD OF PREPARING A COMPOSITION FOR PRESERVING WOOD.

No Drawing.  Application filed November 6, 1920. Serial No. 422,258.

*To all whom it may concern:*

Be it known that I, VICTOR VANDEVOORDE, a subject of the King of Belgium, residing at Brussels, in the Kingdom of Belgium, have invented certain new and useful Improvements in Methods of Preparing a Composition for Preserving Wood, of which the following is a specification.

Numerous processes have already been proposed for the purpose of impregnating and preserving wood and other organic materials. Said known processes have generally been based upon the use of solutions containing metallic salts which have the disadvantage of increasing the electric conductibility of the wood or other organic material and which, further attack or corrode the metal such as iron and steel which is generally put in contact which the wood thus treated. This is the case for instance when the wood, after treatment, is used for the manufacture of railway sleepers upon which metal parts must be fixed bolted or otherwise attached.

My invention has for its purpose to avoid these inconveniences in a most efficient manner, that is to say to preserve the quality of bad conductor of electricity of the wood, to prevent more fully than hitherto the corrosion of the metals which in practice are put in contact with the wood and further to secure a better preservation of the wood than that hitherto attained.

With these objects in view, my invention essentially consists in a method of preparing a specific composition or mixture of the kind of the solutions used when working according to the process described in the U. S. Patent No. 1,057,076 to Henri Monseur, my invention being in fact the result of extensive and practical experiments with the said process.

The composition used according to my invention, and which gives the best results in the application of the Monseur's process consists, as the compositions used according to said process in a mixture of ammoniacal solutions of metals and of preserving or antiseptic products but it is essentially distinguished from the known compositions as hitherto used by the fact that it is formed of a mixture of ammoniacal solutions of metal hydroxides and of metal formate to which is added an ammoniacal solution of phenol.

In carrying my invention into practice the composition which is used preferably comprises an ammoniacal solution of hydroxide of copper, an ammoniacal solution of formate of zinc and an ammoniacal solution of phenol with an excess of ammonia sufficient to hold all the products in solution after dilution.

The proportion of the metals (copper and zinc) in the composition is of about 6% and the proportion of phenol of about 8%.

Such a composition when used for impregnating wood, has this great advantage that after the ammonia has disappeared gradually the remaining salts are quite insoluble in water; further, wood when treated with such a composition has no action upon iron or steel pieces which are brought into contact with the wood; these results are further secured in a more efficient manner than with the generic solutions of the same kind used or tried previously.

What I claim is:

1. A method for manufacturing a wood preserving solution, the said method consisting in preparing an ammoniacal solution of copper hydroxide, preparing separately an ammoniacal solution of zinc formate, the total proportion of copper and zinc being of about 6%, and an ammoniacal solution of phenol containing about 8% of phenol and an excess of ammonia and finally mixing the solutions whereby the products mixed together are maintained in solution.

2. A composition of the kind described consisting of an ammoniacal solution of copper hydroxide, an ammoniacal solution of zinc formate, the proportion of copper and zinc being of about 6%, and an ammoniacal solution of phenol containing about 8% of phenol and an excess of ammonia whereby the products mixed together are maintained in solution.

In testimony whereof I have affixed my signature in presence of two witnesses.

VICTOR VANDEVOORDE.

Witnesses:
 J. SEDE,
 F. Y. LABAUD.